MAGNETIC DATA STORAGE SYSTEM

Filed May 26, 1948 7 Sheets-Sheet 1

Inventors:
Thomas K. Sharpless
Edwin S. Eichert Jr.
by their Attorneys
Howson & Howson Inventors:
Thomas K. Sharpless
Edwin S. Eichert Jr.
by their Attorneys
Howson & Howson Inventors:
Thomas K. Sharpless
Edwin S. Eichert Jr.
by their Attorneys
Howson & Howson Inventors:
Thomas K. Sharpless
Edwin S. Eichert Jr.
by their Attorneys
Howson & Howson Inventors:
Thomas K. Sharpless
Edwin S. Eichert Jr.
by their Attorneys
Howson & Howson Inventors:
Thomas K. Sharpless
Edwin S. Eichert Jr.
by their Attorneys
Howson & Howson

MAGNETIC DATA STORAGE SYSTEM

Filed May 26, 1948 7 Sheets-Sheet 7

Inventor:
Thomas K. Sharpless
Edwin S. Eichert Jr.
by their Attorneys
Howson & Howson Patented Sept. 23, 1952 2,611,813

UNITED STATES PATENT OFFICE 2,611,813

MAGNETIC DATA STORAGE SYSTEM

Thomas K. Sharpless, Haverford, and Edwin S. Eichert, Jr., Springfield, Pa., assignors to Technitrol Engineering Company, Inc., Philadelphia, Pa., a corporation of Pennsylvania Application May 26, 1948, Serial No. 29,324

24 Claims. (Cl. 177—353)

This invention relates to systems for storing information, especially where it is desired to transmit, receive and record the information. More particularly, the invention relates to systems where the information is conveyed by means of groups of electrical impulses of the digital, or pulse and no pulse, sort. While the invention may be used for various purposes, by way of example it may be used to store information concerning reservations on public carriers such as airplane lines, railway lines, etc.

The principal object of the invention is the provision of a system whereby persons at a plurality of remote positions may insert and withdraw information from a centrally located storage unit comprising a plurality of registers each of which will hold its information permanently unless changed by the insertion of new data from any one of the positions. In addition, the storage unit may have associated with it an adding unit in order that numerical information may be stored and accumulated.

A more specific object of the invention is the provision of such a system wherein the information is stored by magnetic recording of pulses on rotating magnetic disks having register areas which are selected through the agency of register-selection voltage combinations representative respectively of the registers and occurring successively in timed relation with the rotation of the disks, the selection of the registers being effected through coincidence of said register-selection voltage combinations and voltage patterns produced by action on the part of an operator.

Other objects and features of the invention will be apparent from the following description.

Figure 3B:
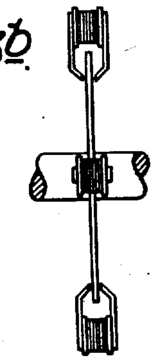
Figure 3A:
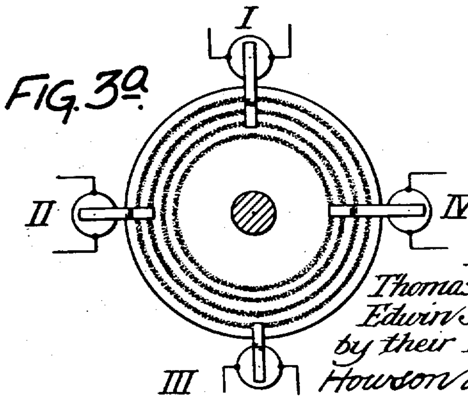
Figure 4:
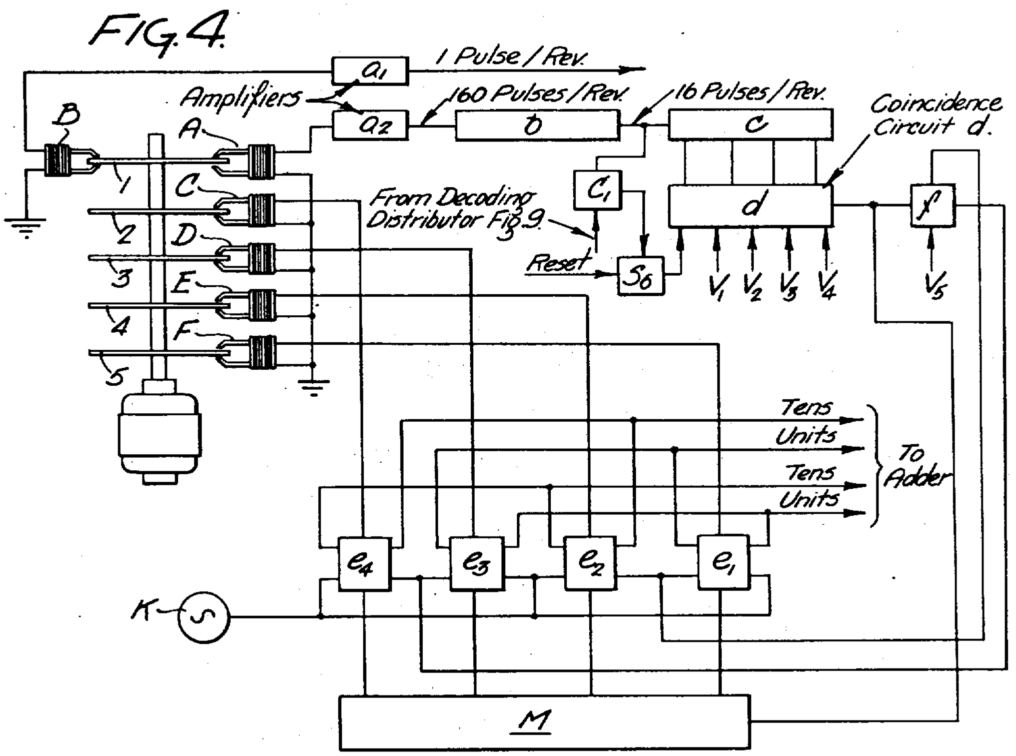
Figure 7:
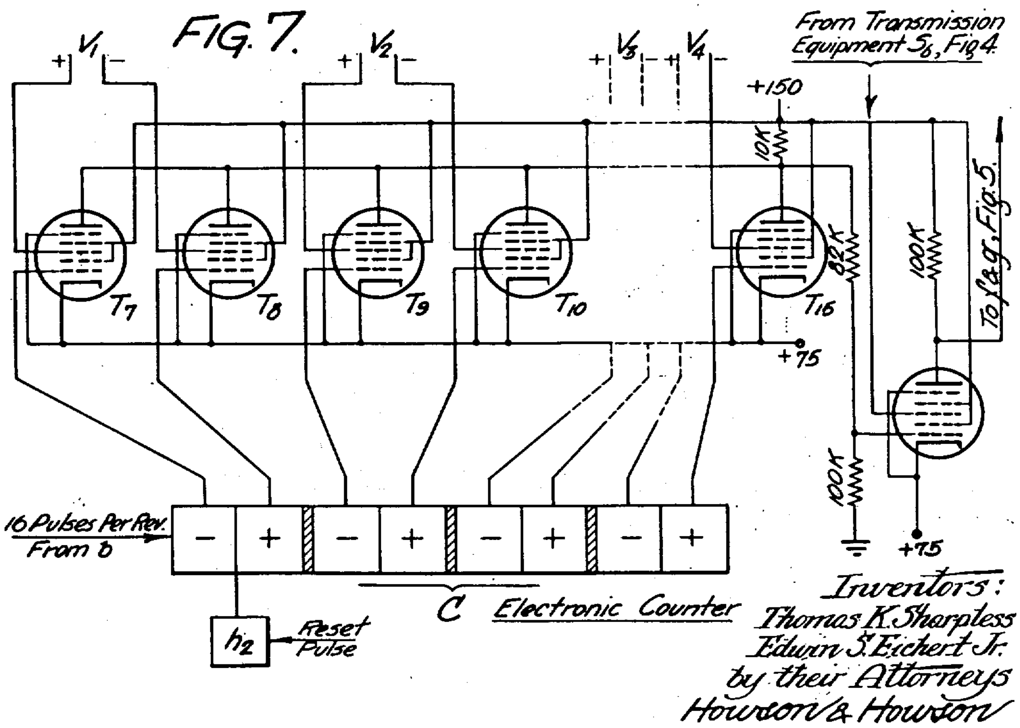
Figure 5:
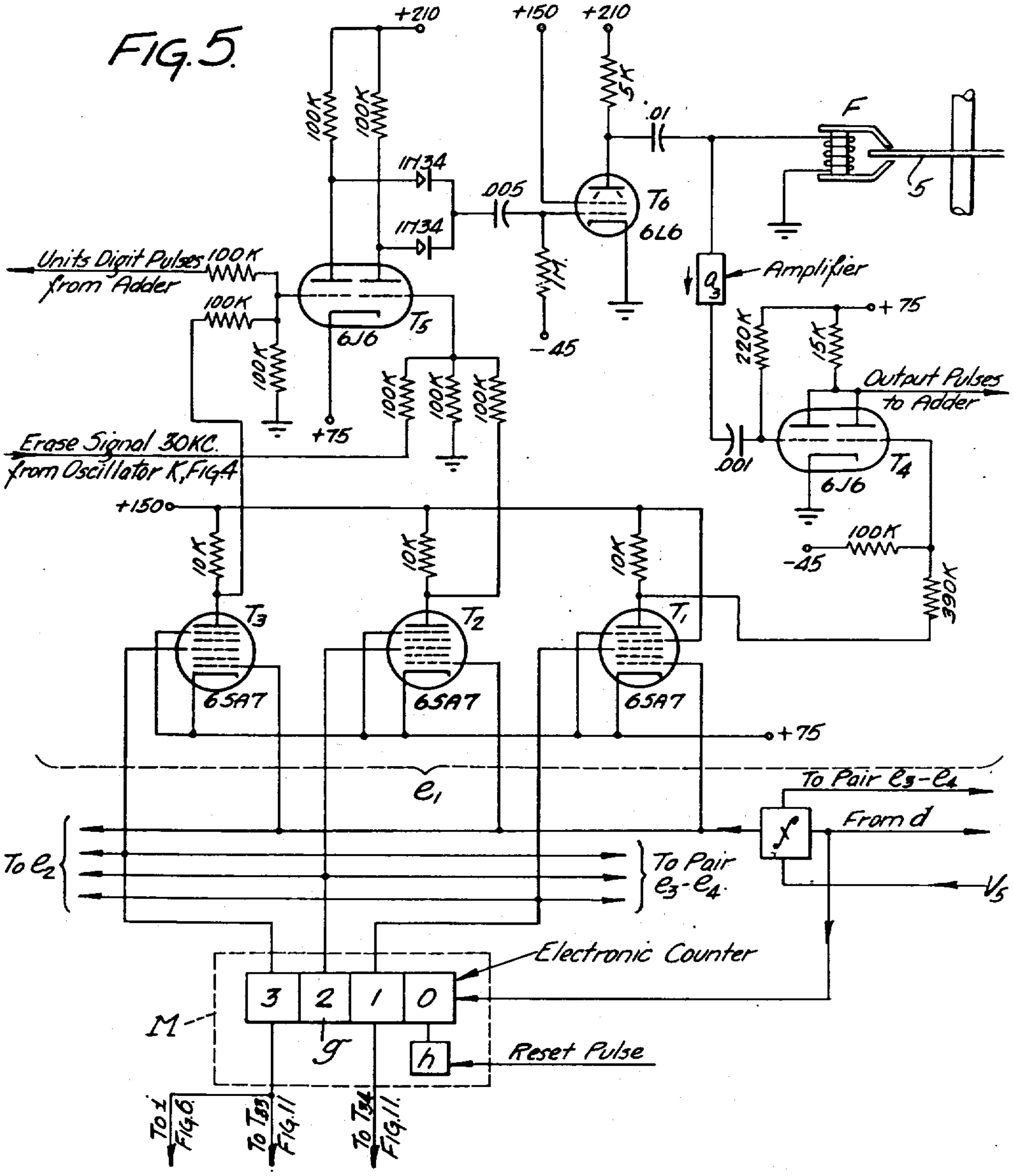
Figure 6:
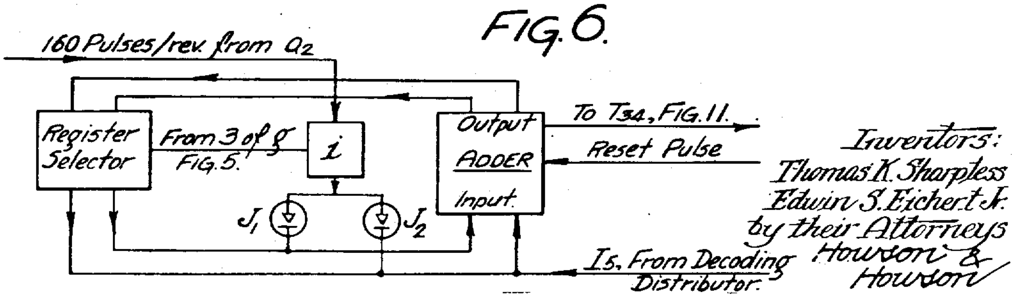
Figure 8:
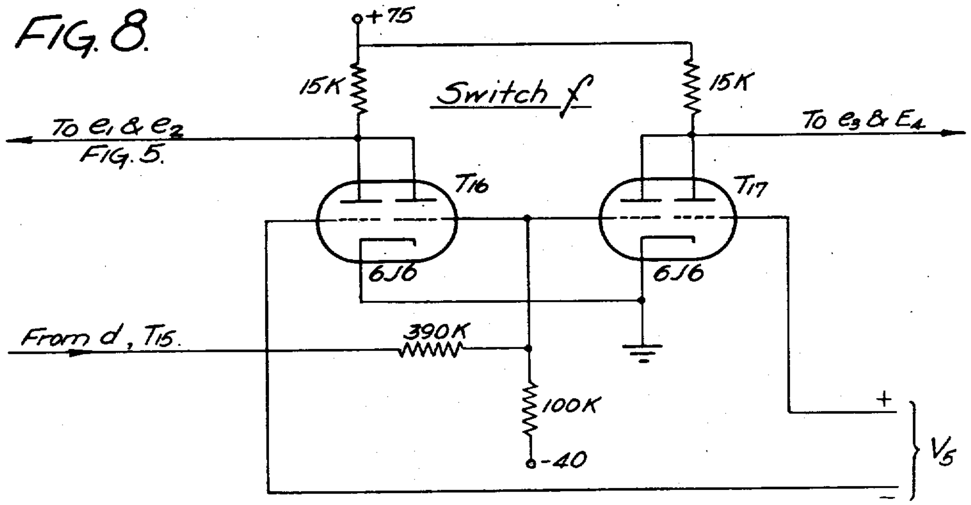
Figure 10:
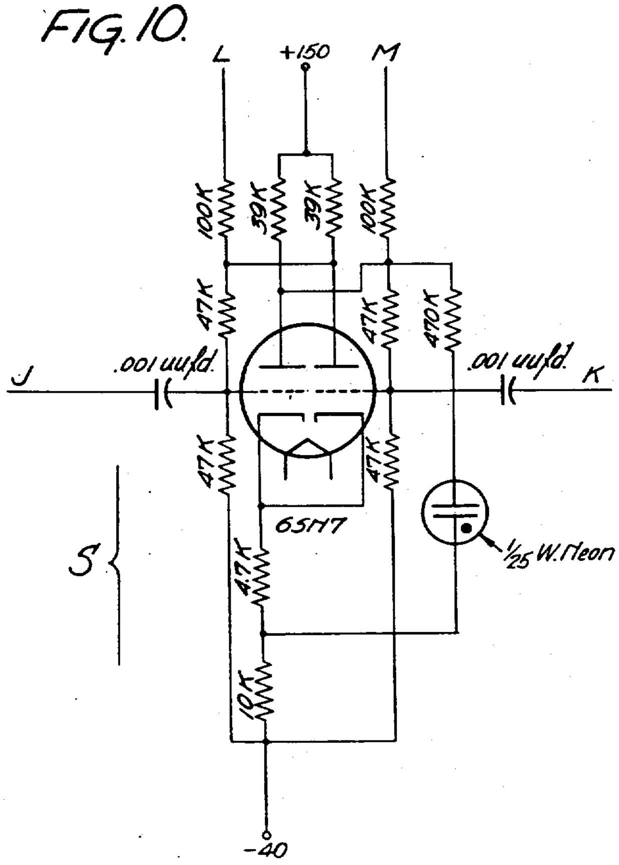
Figure 9:
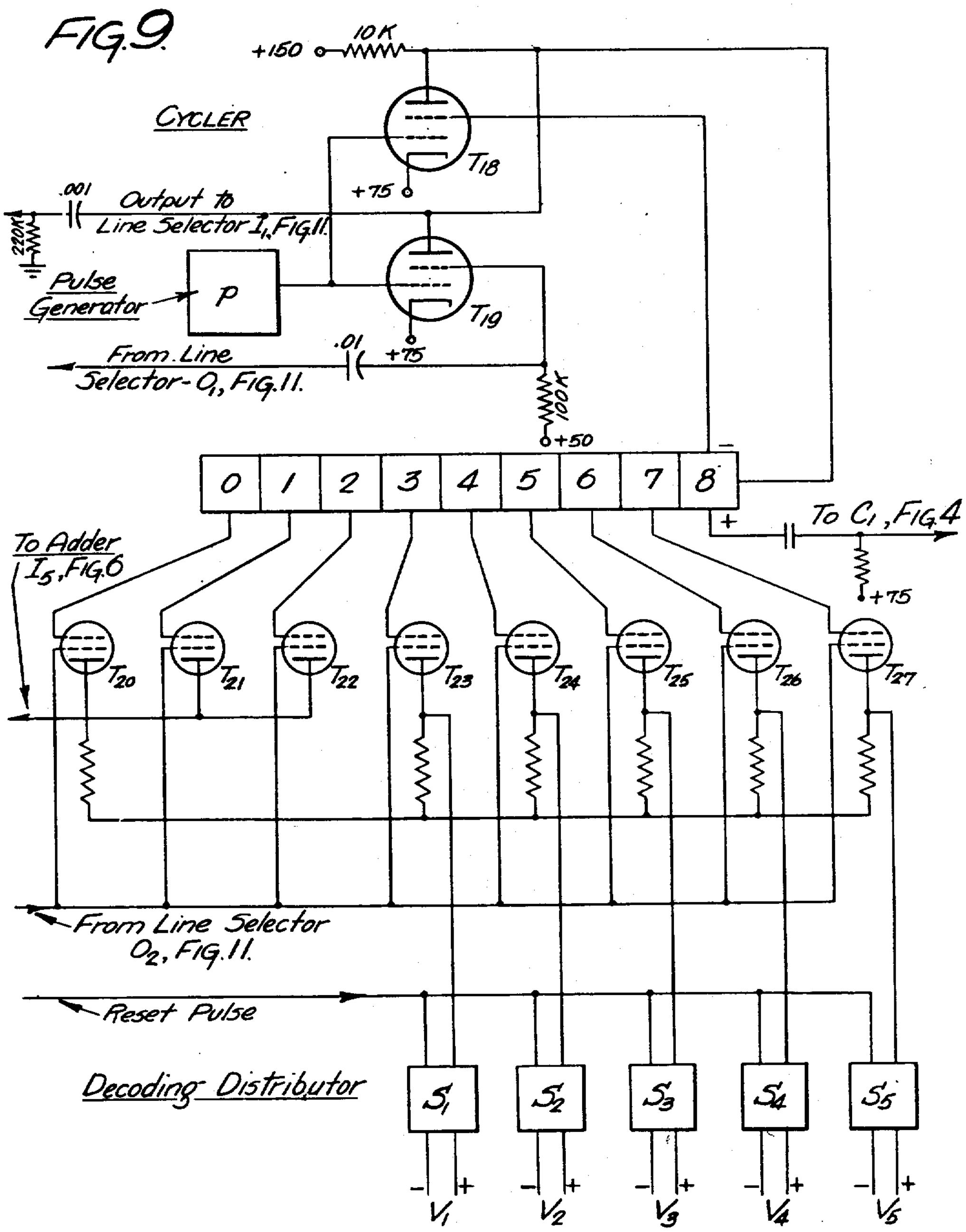
Figures 11, 12:
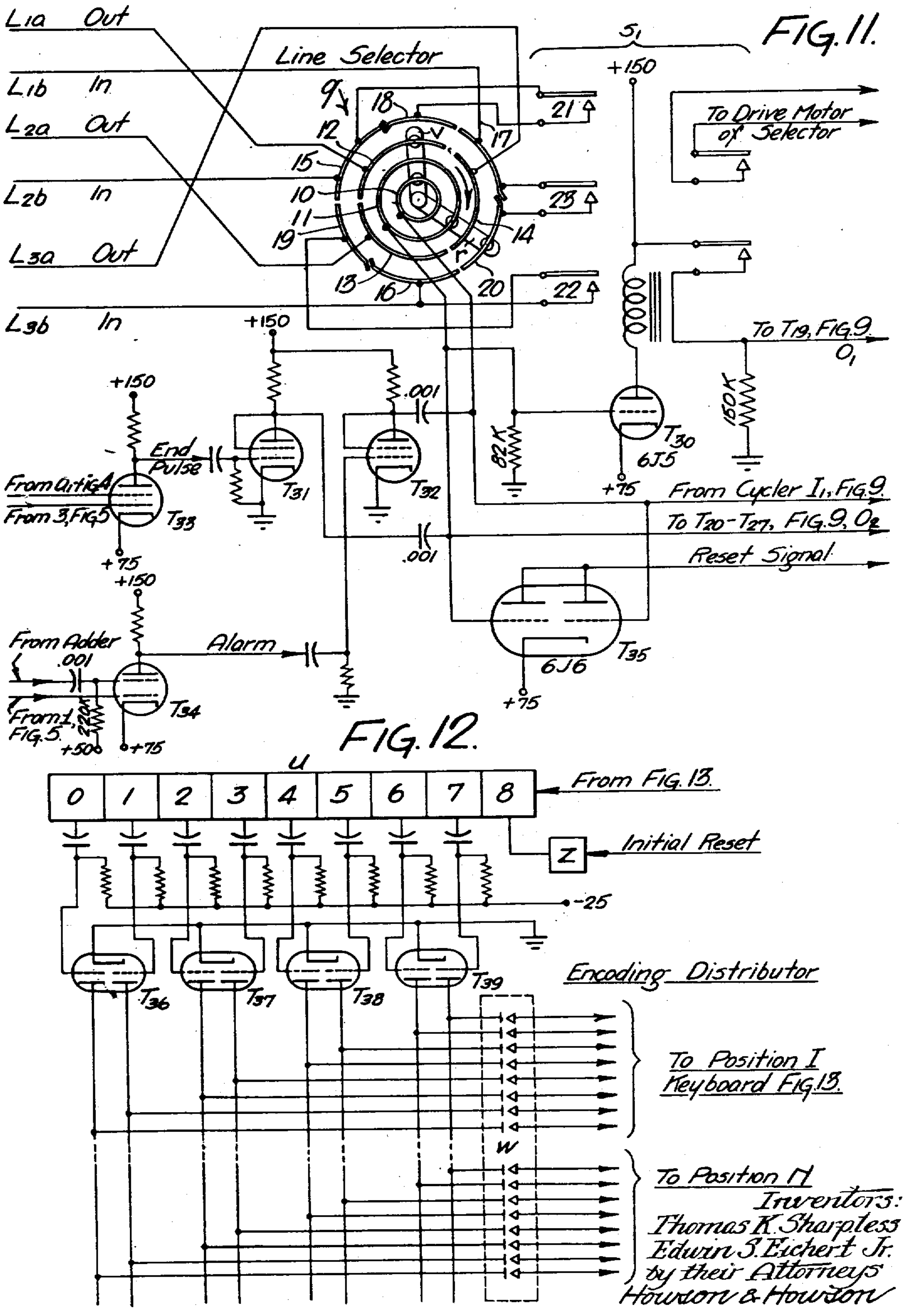
Figure 13:
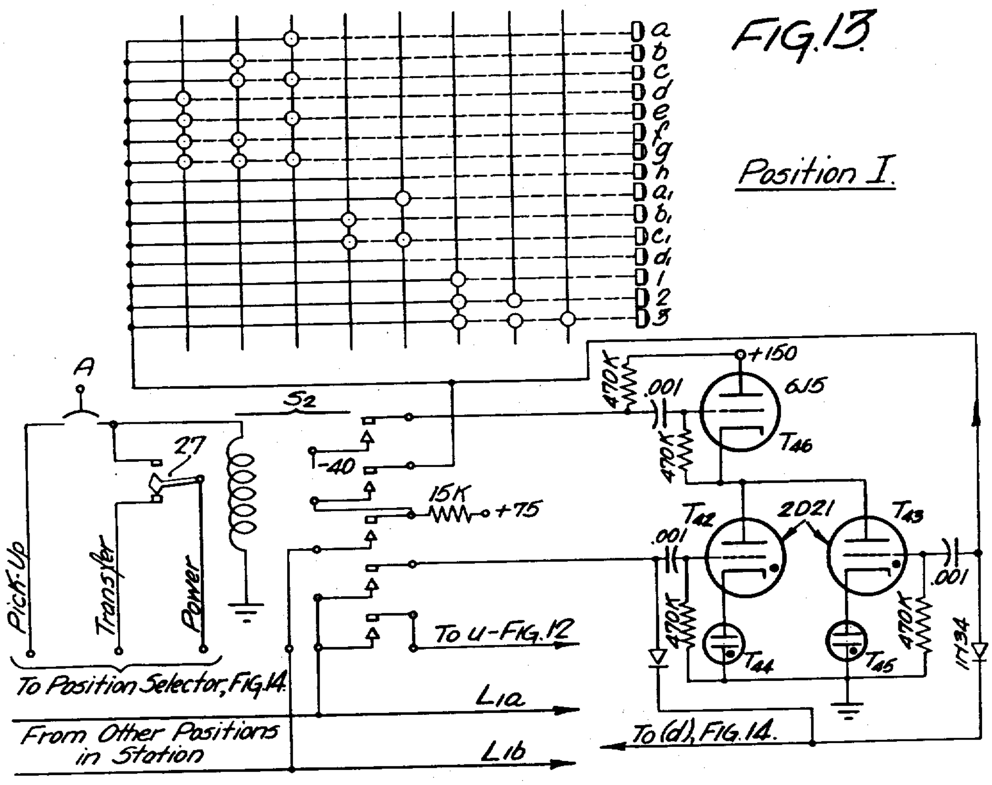
Figure 14:
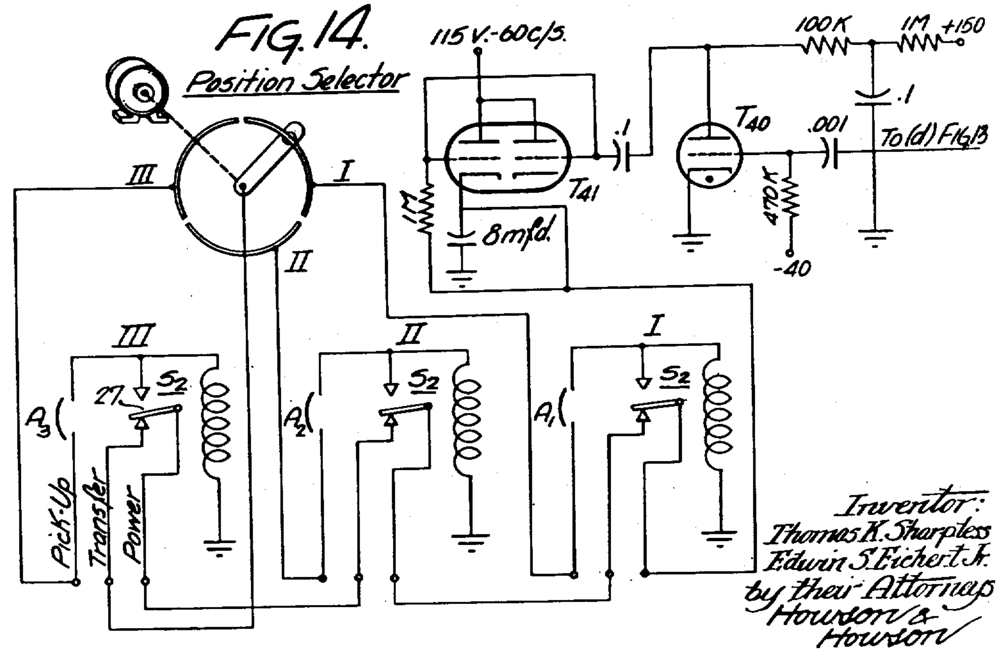

Figs. 3*a* and 3*b* are face and side views respectively of a register disk employing a plurality of recording heads, this being a possible alternative arrangement, as hereinafter described;

Fig. 4 is a generalized illustration of the register selector;

Fig. 5 is a diagrammatic illustration of one of the units of the register selector;

Fig. 6 is a generalized illustration showing the electrical arrangement of the adder in association with the register selector;

Fig. 7 is a diagrammatic illustration of the coincidence circuit *d* employed in the register selector;

Fig. 8 is a diagrammatic illustration of the electronic selecting switch *f* of Fig. 4;

Fig. 9 is a diagrammatic illustration of the cycler and the decoding distributor;

Fig. 10 is a diagrammatic illustration of an electronic switch which is employed at various places in the system;

Fig. 11 is a diagrammatic illustration of the line selector;

Fig. 12 is a diagrammatic illustration of the encoding distributor;

Fig. 13 is a diagrammatic illustration of the equipment at one position of a station;

Fig. 14 is a diagrammatic illustration of the position selector; and

Figure 15:
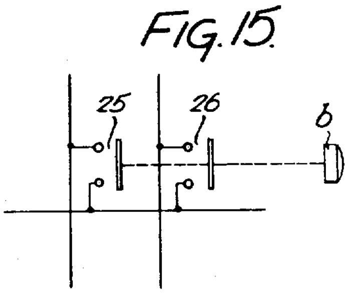

Fig. 15 illustrates a possible arrangement which may be used in the push-button keyboards.

*General description of system*

Figure 1:
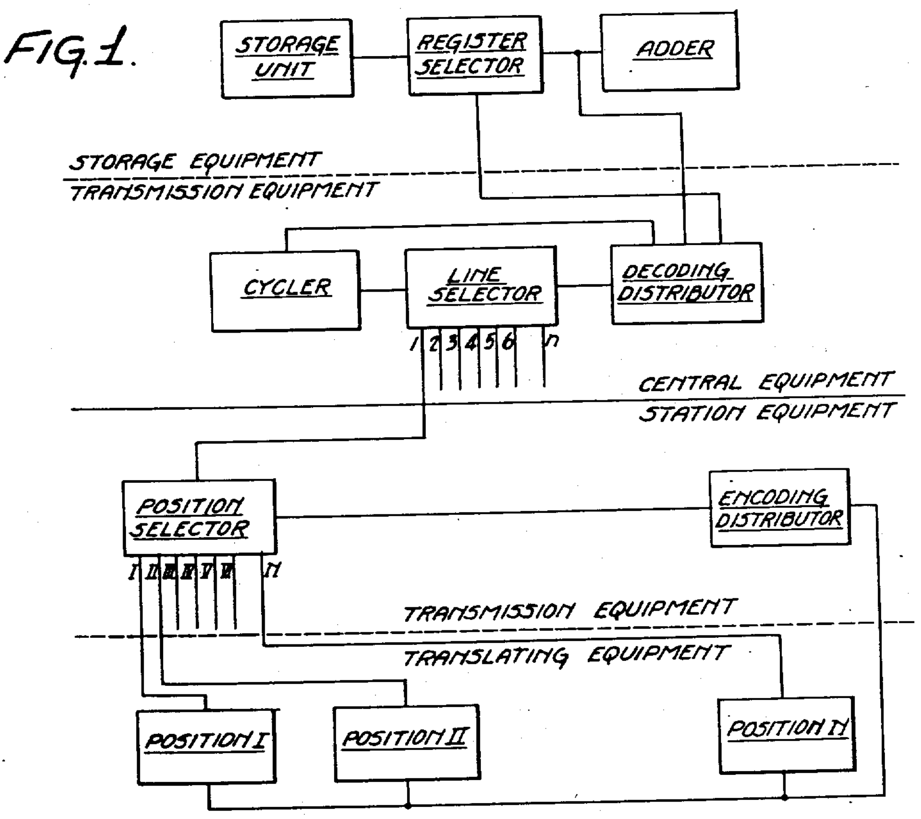
Fig. 1 is a block diagram of an information storage system according to the invention.

Figure 1 shows a generalized view of the subject system. It shows the central storage equipment, the transmission equipment, and the translating equipment. It should be pointed out that the transmission equipment consists of a plurality of lines feeding from a like number of stations. In addition each station permits the use of a plurality of positions. Each position of the translating equipment has thereat a keyboard for inserting and requesting information and an indicator to display information from the storage unit. By setting up the proper keys the operator may select any one of the registers in the storage unit. Likewise, by the setting of other keys he may request the information in that particular register or insert new information in that register. That only one position in a station be operative at any time is assured by an interlocking circuit working in conjunction with the position selector, which guarantees that each position get its turn on the line. The line selector of the central equipment works in a similar manner to prevent interference between lines.

The information for the selection of the register and the information to be stored are transmitted in the form of time division coded groups of electrical impulses, as is common in Teletype systems. In this description such a pulse group will be called a word. The uses of the encoding distributor, cycler, and the decoding distributor for producing the words, will be made clear in the detailed description of the transmission equipment. The register selector, working in conjunction with the decoding distributor, splits the word into its two components, using one part to select the proper register and sending the second or information part either into the register or adder as needed, or if it is merely a request, allowing the register contents to go into the transmission equipment.

The drawings show, diagrammatically and symbolically, the essential components of the system as generalized in Figure 1 and as it has been constructed and successfully operated. In the subsequent description, the component devices and their functioning will be described in succession, commencing with the storage unit and proceeding through to one of the station positions, and then the complete operation of the system will be described.

*Detailed description of the storage unit*

Figure 2:
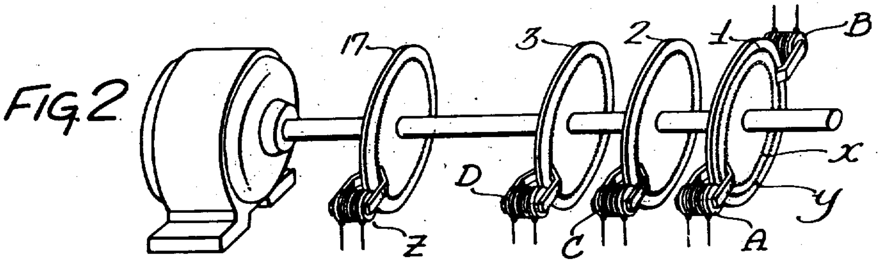
Fig. 2 is a perspective view showing the preferred form of the central storage unit.

The central storage equipment consists of a storage unit making use of the principles of magnetic recording for the purpose of storing the impulses. These impulses are recorded as discrete areas of magnetization around the periphery of a thin circular disk of suitable magnetic material, as shown in Figure 2. A plurality of such disks are mounted on a shaft driven continuously by a suitable motor. Referring to Figure 2, disk 1 is used as a master pulse source, or clock. It has permanently recorded on it two channels, $x$ and $y$. Channel $x$ carries a given number (e. g. 160) of pulses recorded at suitable intervals, leaving a small sector blank. Channel $y$ carries one pulse located in about the center of the segment delineated by the blank sector of channel $x$. The recording heads A and B are located so that their air gaps cover respectively channels $x$ and $y$. Each recording head is connected to a suitable vacuum tube amplifier to bring the pulses to a suitable voltage level for operating the rest of the system.

Still referring to Figure 2, disks 2 through $n$ are used as register disks, each with a single head serving the purpose of recording pulses on the disk, reading the pulses on the disk, and erasing pulses from the disk. The number of disks actually employed will depend upon the requirements in any given instance. Each register disk contains a plurality of registers chosen by counting the impulses from the clock disk. For example, in the presently disclosed system, each register disk contains 16 registers of 10 pulse spaces each. These are delineated by noting every 10th pulse from the 160 pulses recorded on the clock disk.

It should be noted that several channels may be handled on one disk by placing the heads around the disk with their air gaps at different radial distances from the edge. Figures 3$a$ and 3$b$ show such an arrangement using four heads I to IV and four channels. The limitations on the number of channels thus available are set by the depths of the throat of the recording head, and by the closeness with which the magnetic spots may be placed on the disk.

*Description of register selector*

In the illustrated embodiment of the system, the register disks are used in pairs, one disk of a pair being used to record units digits of numbers, and the other disk of the same pair being used to record tens digits of the numbers. Figure 4 is a generalized illustration of the register selector, there being shown four register disks 2 to 5, of which disks 2 and 3 constitute one pair, and disks 4 and 5 constitute another pair. These pairs of disks are selected in a manner presently to be described.

The clock disk 1 gives 160 pulses per revolution through amplifier $a_2$ which pulses drive $b$, a scale-of-ten electronic counter. The 16 pulse per revolution output of this counter is used to operate a counter $c$ consisting of four cascaded scale-of-two electronic counters. The outputs of the four counters give 16 unique combinations of positive and negative voltages per revolution, one for each of the impulses which enter it from $b$. These combinations are repeated each revolution. These output voltages are fed into the coincidence circuit $d$ where coincidence of the voltage combination from $c$ with that of the four input voltages $V_1 \ldots V_4$ produces an output voltage of a duration of 10 pulses, which is applied to two of the electronic switch and amplifier units $e_1 \ldots e_4$, thereby activating the associated recording heads which are used to "Write" input pulses in the register, "Read" pulses from the register, or to "Erase" the pulses already recorded in that register. The scheduling of these operations is carried out by unit M, and is explained below.

It can thus be seen that any one of 16 ten-pulse sectors around a register disk may be chosen by the 16 possible on and off combinations of $V_1 \ldots V_4$. In the system disclosed herein, numerical information is stored using a simple linear code wherein the digit to be stored is represented by a number of pulses equal to that digit, i. e., no pulses for 0, one pulse for 1, and so on to nine pulses for 9. Moreover this same system is designed to store numbers up to 99 and uses one register disk for the units digits and another disk for the tens digits. Thus $e_1$ is connected in parallel with $e_2$ so as to handle both digits of the number simultaneously on the disks 4 and 5. The block $f$ represents a two way electronic switch, as hereinafter described, which serves as a means for selecting register disks 2 and 3 or 4 and 5, depending on $V_5$ being on or off.

The one pulse per revolution output supplied from the clock disk 1 through amplifier $a_1$ is used to initially set the counters so that the registers on the disks will always maintain the same relation with the pulses on the clock disk as checked by counters $b$ and $c$, even though the power be shut off and later turned on with the counters coming up containing arbitrary counts.

The circuits of the amplifiers $a_1$ and $a_2$ are conventional vacuum tube amplifier circuits. The circuit details of the counters $b$ and $c$ are quite well known and have been described by Sharpless (Electronics, March 1948), Blume (Electronics, February 1948), and many others. The symbol K represents a conventional high frequency (e. g. 30 kc.) oscillator which produces the erasing signal. The blocks $C_1$ and $S_6$ represent devices whose nature and purpose will appear later.

Figure 5 shows the details of the switch and amplifier unit $e_1$ which is typical of all four units. In addition, Figure 5 shows how the unit M schedules the operations of Read, Write, and Erase. The block $f$ is the same one shown in Figure 4. The block $g$ represents 4 stages—0, 1, 2, 3—of linear electronic counter. The outputs of three stages are used to turn on the grids of the tubes $T_1$, $T_2$, $T_3$ respectively. The 0 stage has no output used, but is connected to the clear circuit, $h$, which sets the counter to 0 at the occurrence of a reset pulse. The counter $g$ is fed from the output of $d$ of Figure 4, thus stepping each time a coincidence is made in $d$. With no reset pulse present, counter $g$ will step from 0 to 1, from 1 to 2, from 2 to 3, from 3 back to 0, and continue this cycle as long as impulses from $d$ are present.

Still referring to Figure 5, coincidence of a signal from $f$ on the first grids of tubes $T_1$ to $T_3$ with that of the output of the corresponding stage of counter $g$ will produce a negative voltage swing at the plate of the tube in question. The Read circuit, which involves tube $T_4$ and amplifier $a_3$, is activated by the signal from tube $T_1$. Tube $T_4$ is a double triode which is operated with a slightly positive bias on each grid and the plate load resistor chosen so that if either triode section is conducting, the level of voltage at the common plate connection is sufficiently low so as to render any subsequent circuits inoperative. Only if both triode sections are cut off will the plate voltage rise to 75 volts and operate the following circuit. It can thus be seen that only for the duration of the negative excursion of the plate of $T_1$ will the negative pulses applied to the other grid of $T_4$ come out at a voltage level sufficient to operate the output circuits. The negative pulses arrive at $T_4$ from amplifier $a_3$, which receives the pulses from recording head F and disk 5.

The Erase circuit which operates from tube $T_2$ accomplishes a similar object, i. e., that of allowing the high frequency erasing signal from oscillator K (Fig. 4) into the driving amplifier $T_6$ and thence into the head F thereby erasing pulses on disk 5 only for the duration of the signal from tube $T_2$. Here, as long as either input to the right-hand grid of $T_5$ is positive, the grid is maintained positive and the consequent diode action effectively prevents any appreciable signal appearing at the plate of the right hand triode section of double triode tube $T_5$. When the plate of tube $T_2$ swings negatively, the diode action of the grid of tube $T_5$ ceases and large signals appear at the plate.

The other half of tube $T_5$ works similarly to allow input pulses to be recorded on the disk only for the duration of the signal from tube $T_3$. The 1N34 crystal diodes are used in the plate circuit to prevent loading down of one plate by the plate of the other conducting half of tube $T_5$.

It can thus be seen that the functions of reading the disk, writing on it, or erasing from it may be accomplished. The reset pulse is used to initially set $g$ to 0 when the power is turned on and also, as will be explained below, to make it possible to skip the Write or Erase operations under certain conditions.

As mentioned above, Figure 5 shows only the apparatus associated with register disk F. Similar apparatus will be provided for each of the other register disks, as represented by the blocks $e_2$ to $e_4$ in Figure 4.

The coincidence circuit of the block $d$ of Figure 4 is detailed in Figure 7. The cascaded scale-of-two counters $c$ are shown with each half indicating the polarity of its output voltage with respect to +75, the cathode level of vacuum tubes $T_7$ through $T_{14}$. The voltages $V_1$ . . . $V_4$ appear each on two wires. One of the wires is positive and the other negative with respect to +75. These voltages and those from the stages of counter $c$ are fed to the grids of tubes $T_7$ . . . $T_{14}$, which are coincidence tubes similar in function to $T_1$ . . . $T_3$ of Figure 5. Only five of the tubes $T_7$ . . . $T_{14}$ are actually shown but the presence of the others will be understood from the illustration. With the pattern of voltages shown in Figure 7, it can be seen that every tube of the group $T_7$ . . . $T_{14}$ has at least one of its control grids negative with respect to its cathode, thus permitting no flow of current through the common plate load resistor and allowing the plate line to rise to +150. This rise in voltage is delivered through the 82K and 100K step down circuit to one grid of tube $T_{15}$, and is sufficient to turn that tube on when the other grid is driven positive by the "go ahead" signal from the transmission equipment. On examination it will be seen that only when the voltage output pattern of $V_1$ . . . $V_4$ and the counter $c$ agree in opposite phase, as shown, will no current be drawn through tubes $T_7$ . . . $T_{14}$ and a signal operate $T_{15}$. For example, if the $V_1$ . . . $V_4$ pattern is + −, − +, − +, + −, the counter $c$ must give a pattern − +, + −, + −, − +, to cut off all of the tubes $T_7$ . . . $T_{14}$. It will be remembered from the description of the register selector that counter $c$ only remains in any one state for ten pulse times and repeats its cycle with each revolution of the clock disk 1; thus the signal from tube $T_{15}$ will have a duration of ten pulse times and will appear once each revolution at a different part of the revolution for each $V_1$ . . . $V_4$ pattern.

Figure 8 shows the electronic switch represented by block $f$ of Figure 4, and shows how the ten pulse signal from $T_{15}$ is switched into one or the other of the two channels leading to $e_1$ and $e_2$ or to $e_3$ and $e_4$. Here again, a double triode coincidence circuit similar to that of the $T_4$ read out circuit of Figure 5 is used. Negative 10-pulse duration signals from $d$ are applied to $T_{16}$ and $T_{17}$ and, with $V_5$ as shown, will appear only at the plate of $T_{16}$ at the proper voltage level to operate the $T_1$ . . . $T_3$ tubes of the $e_1$ and $e_2$ blocks as shown in Figure 5.

*Description of the adder*

The adder is connected so that it receives its input from two sources as shown in Figure 6. One source is the decoding distributor of the transmission system and the other is the output pulses from the switch-amplifier blocks, $e$, of the register selector. The adder's output is connected to the input pulse lines of the same blocks. Its purpose is to receive numerical information from the transmission system, add this to the contents of a register, and to transfer the sum back to the same register. The details of the adder circuit are not necessary here, since the adder is essentially a two decade accumulator such as described by Burks ("Electronic Computing Circuits," Proc. I. R. E. 35 : 756, August 1947) and by Brainerd and Sharpless ("The ENIAC," Electrical Engineering 67 : 163, February 1948). The block $i$ represents a coincidence or switch circuit similar to those of $T_1$ . . . $T_3$ in Figure 5 and allows a series of pulses to cycle the adder during the Write operation. This cycling is done so that the numerical contents of the adder may be transmitted as described in the above references. The symbols $j_1$ and $j_2$ represent diode buffers which prevent back coupling between the units and tens lines.

*Special features of the central storage equipment*

The foregoing sections have described the central storage equipment of the system. Certain outstanding features are set forth below.

(1) The use of a magnetic storage medium which permits compact storage of impulses, quite high pulse rates for reading pulses on and off, and easy erasure and reuse of the same material. This feature also has the advantage that there will be no loss of stored information in the event of power failure.

(2) The use of the disk form for the magnetic material. This is compact, easily assembled, and easily produced. Moreover, the disks can be rotated at high speeds, allowing a short recess time to any register.

(3) The use of more than one recording channel per disk which, for instance, permits the use of one pulse space per decimal digit in a 4-channel system.

(4) The use of a clock disk as the master source of pulses, which obviates all synchronizing problems between disks.

(5) The use of electronic counters and switching circuits which operate at pulse rates up to hundreds of thousands per second. Such high speed switching and counting permits the use of high pulse rates from the clock disk, thereby greatly speeding the operation of the whole system.

(6) The use of binary or base two combinations for the selection of registers. This means that each scale-of-two stage added to counter *c* will double the number of registers one can select.

*General description of central transmission equipment*

The central transmission equipment (Fig. 1) comprises three major components, the cycler, the decoding distributor, and the line selector. The cycler consists of a continuous pulse generator working in conjunction with a coincidence circuit which is under the control of the decoding distributor. The cycler will, when released by a signal from the line selector, give forth a continuous burst of a given number of pulses. These pulses cycle the decoding distributor and also go out over a line to a station where they are coded up as a group of timed pulses, or word, in the station equipment. They then return over the transmission line and are distributed into the proper channels of the central equipment by the decoding distributor. The line selector scans in turn each of the plurality of lines leading into the central equipment. When one of these lines is activated from a given station, the line selector will "lock-up" on that line and will release the cycler. It will remain on that line until it receives a "reset signal" from the register selector when it resumes its scanning.

*Details of the cycler*

Figure 9 shows in detail how the cycler operates in conjunction with the nine stage linear counter *m* of the decoding distributor to give out a group of 9 pulses to the transmission equipment. The block *p* represents a conventional pulse generator which may be of the multivibrator sort, and which continuously supplies positive impulses to one grid of tubes $T_{18}$ and $T_{19}$. Tubes $T_{18}$ and $T_{19}$ are coincidence tubes, like $T_1 \ldots T_3$ in Figure 5. For the present purpose it suffices to show only the cathode, two control grids, and the output plate of each tube. The second grid of $T_{18}$ is directly connected to the negative output of stage 8 of counter *m*, so that it is cut off when *m* is on that stage. The second grid of tube $T_{19}$ is cut off by the bias voltage supplied through the 100K resistor. Consequently no pulses from *p* can enter *m* nor the output circuit, except when a positive impulse from the line selector is applied to the second grid of $T_{19}$ through the 0.01 capacitor, causing that tube to permit one pulse to pass. This pulse goes out the output and also steps the counter *m* from stage 8 to stage 0. Pulses now can pass through tube $T_{18}$ until *m* arrives back on stage 8, when $T_{18}$ will again be cut off and the device will lock up, awaiting another positive impulse on the second grid of $T_{19}$. It should be noted that this positive triggering pulse must have the duration of at least one pulse time and not more than eight. This requirement is easily met by the proper choice of the values of the capacitance and resistance in the coupling circuit to the second grid of $T_{19}$.

*Details of decoding distributor*

Figure 9 also shows the decoding distributor. The tubes $T_{20} \ldots T_{27}$ are coincidence tubes, as mentioned previously, and for simplicity only the two input grids and the output plate of each tube are shown. As counter *m* steps onto 0, 1, 2 . . . 7, each one of the first grids is driven on in turn so that if a pulse is on the input line from the line selector during a particular part of the cycle, that pulse will appear at the plate of the tube whose first grid is positive. In this manner the pulses from the cycler, which have been time division coded into a word in the translating equipment of the station and are returning to the central equipment, are distributed either to the adder or to the coding switches $S_1 \ldots S_5$, which produce the previously-mentioned voltages $V_1 \ldots V_5$. It should be noted that the pulse arrives at the second grid of $T_{20} \ldots T_{27}$ simultaneously. It arrives there, however, delayed by the time of travel from $T_{19}$ out over the transmission equipment, through the translation equipment, and back over the transmission equipment. Thus the pulse repetition period of *p* must be greater than the time of travel of the pulse over the route indicated. If this cannot be done without too great a sacrifice of speed, as for instance might be necessary for use with very long lines, extra stages may be added to *m* between 8 and 0 to take care of the initial delay. It will be noted that tubes $T_{20}$, $T_{21}$ and $T_{22}$ are connected together to the adder so that pulses in the first three time positions of the word enter the units decade of the adder. $T_{23} \ldots T_{27}$ are connected individually to $S_1 \ldots S_5$ and thereby convert the last five pulses of the word into the voltages $V_1 \ldots V_5$ which operate the register selector coincidence circuit.

Figure 10 shows a circuit suitable for use as the S blocks. It is a typical Eccles-Jordan trigger circuit which has two stable states, set and reset. When set the M output is positive and the L output negative. When reset M is negative and L positive.

A negative pulse applied to the J input will set the circuit while a similar signal on K will reset it. The voltages $V_1 \ldots V_5$ of Figs. 7 and 8 are produced by the L and M outputs of $s_1 \ldots s_5$ of Fig. 9.

*Description of the line selector*

The line selector used in the particular system disclosed is shown in Figure 11. Merely by way of illustration, the line selector is shown as being adapted to scan periodically three lines each consisting of a pair of wires balanced to ground. The line $L_{1a}$ and $L_{1b}$ is the one which extends to the typical station equipment hereinafter described. As shown the line selector is in the form of a commutator *q* which comprises input and output arms *r* and *v* on a common motor-driven shaft, and stationary contact segments engageable by the respective arms. Arm *v* makes continuous contact with ring 10, while arm *r* makes continuous contact with ring 11. These rings have external circuit connections as shown. Arm *v* also makes contact successively with three stationary contact segments 12, 13 and 14 which are insulated from one another. Arm *r* makes contact successively with stationary contact segments 15, 16 and 17 with which there are associated auxiliary segments 18, 19 and 20 respectively. The latter are connectable to their respective associated main segments through contacts 21, 22 and 23 of relay $s_1$. The purpose of the auxiliary segments will be explained presently. As the arms $r$ and $v$ rotate, they "scan" the three lines which are connected to the stationary segments. Each line consists of an input wire and an output wire as shown.

The input arm $r$ is connected (through ring 11) to the grid of vacuum tube $T_{30}$, which is used to control the relay $s_1$. Arm $r$ is also connected through to the input of tubes $T_{20}$ . . . $T_{27}$ of Figure 9. The output arm $v$ is connected (through ring 10) to the output from $T_{18}$ and $T_{19}$ of the cycler, Figure 9. Both arms are also connected to the indicator circuits, $T_{31}$ and $T_{32}$. The purpose of these tubes is to send positive pulses out on the line to operate the indicator lights at the keyboard positions, as will be described later.

The operation of the line selector is as follows. With the commutator revolving, the input arm $r$ contacts a line with a positive potential on it, which indicates that the line is activated. This positive potential is thus applied to the grid of tube $T_{30}$, turning it on and drawing current through relay $s_1$, which picks up, opening the drive motor circuit and closing the contacts to the auxiliary segments on the input ring of the commutator. These auxiliary segments are vital to the action of this device. The commutator and motor have rotational inertia and will continue to move a short distance after the power is removed. If the auxiliary segments are not present, the selector might pick up near the end of one segment and the arm coast beyond, thus dropping the selector again without locking up. However, with auxiliary segments which are slightly longer than the maximum coast this objection is overcome. For now $s_1$ will only pick up while the arm is on the main segment, and with the auxiliary segment switched in by the action of $s_1$ the arm cannot coast by and drop $s_1$ again. Of course the contact the arm makes in going from the main segment to the auxiliary segment must be of the shorting type. As $s_1$ picks up, it also applies a positive potential to the capacitor input to tube $T_{19}$ of Figure 9, thus releasing the cycler as described above. The line selector is released by either one of the indication signals resetting the keyboard at the station end of the line which removes the positive potential from the line and the grid of tube $T_{30}$, thus releasing relay $s_1$. The commutator is now free to continue its scan.

*Description of the indicator signals*

The indicator signals in the system described herein are quite simple. Their function is to indicate whether or not any total produced by adding a number from the station to the contents of a register exceeds 99. The signal which indicates the exceeding of 99 is called the alarm. The pulse indicating that it does not is called the end pulse. When an alarm takes place it is required that the old contents of the register be kept intact. The first step of the action of this system is for the word to arrive in the decoding distributor and the number part to be inserted in the adder. The second step, when the first register coincidence is made, is to read the register contents into the adder. This occurs while the counter $g$ of Figure 5 is on 1. The third step is on the next register coincidence when $g$ is on 2 and the register is erased. The final step occurs with the third register coincidence when $g$ steps onto 3 and the contents of the adder are written into the register. At the end of this period the reset pulse resets the whole central equipment. The reset pulse is produced from the end pulse, as shown in Figure 11. The end pulse results from coincidence of a positive signal from stage 3 of $g$ and a pulse from $a_1$ of Figure 4. This pulse, which is negative, cuts off tube $T_{31}$ of Figure 11, producing a positive indicator pulse on the "out" side of the line. This positive pulse produces a negative pulse at the plate of tube $T_{35}$, which is the reset signal. The indicator pulse thus produced occurs only when the sum in the adder, at the end of the second step, does not exceed 99. Similarly, the alarm produces an indicator signal on the "in" side of the line and a consequent reset signal. Here the alarm results from coincidence between the tens decade of the adder landing on zero and the 1 or read period of counter $g$, Figure 5. The reset signal thus occurs during the read step and prevents the other steps ever taking place. Moreover, the indicator signal sent out indicates that such has exceeded 99 because the tens decade of the adder can never land on zero unless that is so.

*General description of station equipment*

The station equipment comprises the position selector, the encoding distributor and a number of positions, each consisting of a keyboard and indicator panel. The keyboard provides the operator with a means for writing words—pulse groups carrying the desired information and identification of the register in which that information is to be inserted. The indicator panel provides a means for suitably displaying the information that is returned from the central storage equipment. The encoding distributor is used to distribute the continuous group of pulses arriving over the line from the cycler of the central equipment onto a number of wires which run into the keyboards so that the pulses may be coded into suitable groups. The position selector is a device which assures that no two positions can operate simultaneously, and in addition makes sure that each position gets a turn and that no one position can monopolize the line.

*Description of encoding distributor*

The encoding distributor of the disclosed embodiment of the invention is shown in detail in Figure 12. It consists of a nine stage linear counter $u$, similar to counter $m$ in the decoding distributor of Figure 9. Its input receives the burst of pulses from the central cycler when the line is picked up by the central line selector. These pulses cycle $u$ through its 9 stages, returning it to 8. From every stage but 8 the signal produced by the counter arriving at that stage is differentiated, producing a pulse which is amplified by one of the tubes $T_{36}$ . . . $T_{39}$. There are eight wires, each carrying one of these pulses, leading through the buffing circuits $w$ to the keyboards. These diode buffing circuits are necessary to prevent back circuits between the several keyboards. The counter $u$ has associated with it a reset circuit $z$, which is activated to initially set $u$ on 8 when the power is turned on. It should be noted that no such arrangement is needed in $m$ of Figure 9, since that counter is part of the cycler and will automatically lock up on 8. It can now be seen that synchronism is maintained between counters $m$ and $u$, since both receive the same number of pulses from a single source and both start counting from the same position.

*Description of keyboard and position selector*

The eight wires from $w$ are fed to a keyboard with push button contacts arranged as in Figure 13. Here the pressing of the appropriate keys connects several of the eight wires to a common output, thus providing a means for getting pulses on this output at different times in the cycle in order to produce a word. In the keyboard illustration of Fig. 13, the push buttons are represented at $a$, $b$, $c$, etc. The broken lines extending from the push buttons simply indicate the mechanical operator, such as a push rod, extending between the push buttons and the actuated contacts. The small circles 24 at certain intersections of the vertical and horizontal solid lines indicate the points at which connections are effected by the push buttons. It will be seen that some of the push buttons connect more than one of the vertical wires to the common output.

Fig. 15 better shows how the push buttons effect connection of the vertical wires to the horizontal wires. The push button $b$ is shown, which connects two of the vertical wires to a horizontal wire through the medium of contacts 25 and 26.

Referring again to Fig. 13, the keyboard is also provided with a start button, A, which picks up relay $s_2$ when the position selector (Fig. 14) is in the proper position. When relay $s_2$ picks up it connects the 15K resistor to the output of the push button group and also connects this to the side $L_{1b}$ of the line leading from the station to the central equipment. At the same time it connects the input of counter $u$ to the side $L_{1a}$ of the line leading back from the central equipment.

It will be noted that this K resistor serves as the plate load for tubes $T_{36}$ . . . $T_{39}$ (Fig. 12), and that since tubes $T_{36}$ . . . $T_{39}$ are normally biased to cut-off, the pulses appearing on the common keyboard line and which travel out to the central equipment are negative.

The operation of relay $s_2$ also connects the indicator panel to the two sides of the line and, in addition, operates the interlocking contacts 27 that prevent the other positions from picking up.

The operation of the position selector and this interlocking circuit is best understood by examining Figure 14. In this figure, the position selector is shown in conjunction with the relays $s_2$ of three positions. The motor-driven commutator 28 switches the power to each pick-up lead in turn. The power is fed from the grid-controlled rectifier $T_{41}$ through the transfer contacts of the relays $s_2$. Thus, if any relay is picked up, its transfer contact is open and power is no longer fed to the commutator and thence to the pick-up lines of the other relays. Consequently no other relay can pick up. The relay is dropped out at the end of the process by a positive signal from the indicator (Fig. 13) triggering the thyratron $T_{40}$ and momentarily cutting off the rectifier $T_{41}$ removing all power from the relays.

The operation of the keyboard is as follows. The operator first depresses the push buttons selecting the register and giving the desired information. He then presses button A; relay $s_2$ picks up and thus applies a positive potential to the side of the line feeding arm $r$ (Fig. 11) of the central line selector. The line selector picks up relay $s_1$ when arm $r$ contacts the appropriate segment and the cycler (Fig. 9) gives out its burst of 9 pulses. These go over the arm $v$ and its side of the line, through the contacts of relay $s_2$ to counter $u$, which cycles producing one pulse on each of the eight wires in turn. These pulses are fed by the push button contacts of the keyboard onto the side of the line leading to arm $r$ and thence into the decoding distributor where they are used as described previously. The central equipment now goes through its operation and an indicator signal is produced at $T_{31}$ or $T_{32}$ (Fig. 11) which returns through the keyboard relay $s_2$ and operates the lamps on the indicator panel.

*The indicator panel*

Figure 13 shows the indicator panel. $T_{42}$ and $T_{43}$ are thyratron tubes which are fired by the positive indicator pulses on the respective sides of the line. Since $T_{42}$ and $T_{43}$ are normally cut off they are not affected by the negative pulses of the word transmission. When $T_{42}$, or $T_{43}$, is fired the neon glow lamp $T_{44}$, or $T_{45}$, in its cathode is lighted and serves as a visible signal. The light will remain on after the relay $s_2$ has dropped out. $T_{46}$ and associated circuit and relay contact are arranged so that a negative pulse from the contact closing turns off $T_{42}$, or $T_{43}$, when relay $s_2$ picks up. The 1N34 crystal diodes serve as buffing circuits so that either one of the positive indicator signals may trigger $T_{40}$ of Figure 14 and drop out $s_2$.

*Description of over-all operation*

In the foregoing sections the various component parts of the system have been described. To better enable a clear understanding of the entire system, however, it is deemed advisable to describe the over-all operation.

The operator at any position in a station presses the keys on the keyboard to give the desired information. These keys latch up, making contacts as shown in Figure 13. The operator then closes the switch A, which starts the operation by picking up the relay $s_2$ if power is in the "pick-up" lead. This latter can only occur when no other position is active, as shown in Figure 14. As relay $s_2$ picks up, $L_{1b}$ is pulled positive by +75 volts through the 15K resistor, and by the same action the plate load and voltage is applied to the tubes $T_{36}$ . . . $T_{39}$ of the encoding distributor, Figure 12. The line selector, Figure 11, meanwhile is scanning each line and when it finds $L_{1b}$ positive, tube $T_{30}$ turns on and closes relay $s_1$, locking up the line selector and applying a positive step of voltage to $O_1$, the input of the cycler, Figure 9. This step is turned into an impulse of sufficient duration to pass at least one pulse from the oscillator $p$ through tube $T_{19}$ to the counter $m$. This one pulse steps the counter off of stage 8, thereby opening $T_{18}$, which will remain open until the counter returns to that stage. Thus 9 pulses are passed through the connection $I_1$ and the line selector to $L_{1a}$. These nine pulses on $L_{1a}$ return to the relay $s_2$, Figure 13, and through its circuits to the encoding distributor counter $u$ of Figure 12. The counter steps through nine counts, putting one pulse in turn on each of the 8 grids of tubes $T_{36}$ . . . $T_{39}$. Whichever of these tubes is connected in by the setting of the keys of the keyboard will send negative pulses through the contact of $s_2$ onto line $L_{1b}$. These pulses are thus coded into a word. The word travels over line $L_{1b}$ through the line selector (Fig. 11) and connection $O_2$ to the decoding distributor, Figure 9. The first three pulses of the word are sent via $I_5$ to the units input of the adder, while the last five go to the electronic switches $S_1$ . . . $S_5$ to produce the selection voltages $V_1 \ldots V_5$. As *m* arrives back on stage 8, it produces a positive pulse, which is applied to $C_1$ of Figure 4. A simple coincidence circuit, such as $T_1$, $C_1$ passes one of the 16 pulses per revolution from counter *b* of Figure 4, which sets $S_6$. $S_6$ is a switch circuit exactly like $S_1$. Its positive output is applied to $T_{15}$ of Figure 7, thus passing the selector coincidence pulses only after a word has been received from a station. We now have a number in the adder, the $V_1 \ldots V_5$ selection voltages set up, and $S_6$ set to pass a selector coincidence.

The first selector coincidence which now occurs produces a pulse at the plate of $T_{15}$. This pulse is of duration equal to ten clock pulses, or one register. This pulse steps counter *g*, Figure 5, onto 1 and makes coincidence in $T_1$, opening up the read circuits and sending the pulses stored in that register to the adder, where they add to the number already there. If the sum does not exceed 99, the process continues as follows. The next coincidence pulse steps *g* to 2 and, coincidence being made through $T_2$, the erasing circuits are activated and the contents of the register erased. On the next revolution of the disk a third coincidence pulse occurs. This steps *g* to 3, which opens the recording circuits and also the transmission circuits of Figure 6, as well as $T_{33}$ of Figure 11. The circuits of Figure 6 cycle the adder, sending the sum into the recording circuits of Figure 5, and recording that sum in the register. At the end of this revolution, the single pulse from the clock disk and amplifier $a_1$ is applied to $T_{33}$ in Figure 11, producing the end pulse, indicator pulse, and reset pulse as described. The reset pulse sets the switches $S_1 \ldots S_6$ and the counters *g*, *c*, *b*, back to normal, thereby preparing the equipment for another turn. The positive indicator pulse goes out over line $L_{1b}$ through $s_2$ and to $T_{41}$ of Figure 14. It lights $T_{45}$ and also goes to $T_{40}$ of Figure 14, where it drops out $s_2$ and frees the line, which in turn drops $s_1$ of the line selector by removing the positive voltage from $L_{1b}$. This whole operation requires 9 pulse times of the transmission equipment pulses @ 1000 per second, i. e., 0.009 second, and 3 revolutions of the disk @ 30 revolutions per second, i. e., 0.1 second, plus pick-up and drop-out time of relays $s_1$ and $s_2$, i. e., 0.03 second. This gives a total of 0.139 second.

To retrace our steps a bit: If the sum of the adder exceeds 99 during the read period the tens decade will arrive on zero. This will produce a pulse at $T_{34}$ of Figure 11. $T_{34}$ is controlled by stage 1 of *g*, Fig. 5, so that an alarm pulse can only occur during the read period. When an alarm pulse occurs everything happens just as with the end pulse, except that the positive indicator pulse is on line $L_{1a}$ and lights $T_{44}$. Since everything is reset with the alarm signal, the action ceases then and the system skips the erase and records periods, leaving in the register the number that was previously there.

From the foregoing description, it will be seen that the invention provides an information storage system which embodies:

(1) A central storage unit consisting of a plurality of registers.

(2) Means for selecting those registers in accordance with a pattern of voltages on a group of wires.

(3) Means for reading from, erasing, and recording in a register.

(4) Means for adding numerical information to the contents of a register and returning the sum to the register.

(5) Means for obtaining that numerical information from a plurality of remote manually operated positions with no interference between positions.

(6) Means for manually setting up the abovementioned voltage pattern from the said remote positions.

(7) Means for indicating to the operator at a position that the accumulated number in a register exceeds or does not exceed a given number.

(8) Means for releasing the equipment after one operation so that other operations may be performed.

It is believed to be novel to provide a completely automatic information storage system of such flexibility and speed as that disclosed herein. This system has been constructed and successfully operated. One of the tremendous advantages of this system is its speed, as it takes less than $\frac{2}{10}$ of a second for the complete operation to take place once the start button A has been pushed. In addition, it should be pointed out that the number of decimal digits can be increased very readily, with no loss of speed, by adding more decade units in the adder and more disks to the storage unit. Moreover, the number of registers it is possible to choose among can readily be increased to many thousands, sacrificing in speed only the time occupied by one word. This is a relatively short time, since even ordinary telephone lines can carry pulses at the rate of one thousand per second. Consequently a word containing 20 pulses, which would permit one to choose $2^{15}$ or somewhat over 32,000 registers and insert any digit up to five in the adder, would require only 20 milliseconds of the total cycle of $\frac{2}{10}$ second.

It will be understood, of course, that the invention is not limited to the particular embodiment shown and described, but is capable of various modifications and further embodiments without departing from its scope.

We claim:

1. In an information storage system, rotatable magnetic disk recording means including a plurality of registers adapted to receive numerical information and to have such information erased therefrom, means for producing different register-selection voltage combinations representative respectively of said registers and occurring successively in timed relation with the rotation of said disk recording means, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, means operable upon selection of said register for indicating whether or not any number already stored in said register plus that to be stored exceeds a given number, and means operable only in the event that said given number will not be exceeded for erasing the number already in said register and for storing therein the sum of the erased number and the additional number which it is desired to store.

2. In an information storage system, rotatable magnetic disk recording means including a plurality of registers adapted to receive numerical information and to have such information erased therefrom, a master magnetic disk rotatable synchronously with said rotatable disk recording means, said master disk having recorded thereon pulses corresponding in number and time sequence to said registers, means for producing from said recorded pulses different register-selection voltage combinations representative respectively of said registers and occurring successively in timed relation with the rotation of said disk recording means, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, means operable upon selection of said register for indicating whether or not any number already stored in said register plus that to be stored exceeds a given number, and means operable only in the event that said given number will not be exceeded for erasing the number already in said register and for storing therein the sum of the erased number and the additional number which it is desired to store.

3. In an information storage system, a central station, rotatable magnetic disk recording means at said station including a plurality of registers adapted to receive numerical information and to have such information erased therefrom, means at said station for producing different register-selection voltage combinations representative respectively of said registers and occurring successively in timed relation with the rotation of said disk recording means, an operating station having a plurality of operating positions thereat, means under control of an operator at any one of said positions for producing a group of pulses indicative of a particular register and also containing numerical information which it is desired to store in that register, means for transmitting said pulses to said central station, means at said central station responsive to some of said pulses for producing a pattern of voltages, means responsive coincidently to said voltage combinations and said voltage pattern for selecting said register, means operable upon selection of said register for indicating at the operating position whether or not any number already stored in said register plus that to be stored exceeds a given number, and means operable only in the event that said given number will not be exceeded for erasing the number already in said register and for storing therein the sum of the erased number and the additional number which it is desired to store.

4. In an information storage system, a central station, rotatable magnetic disk recording means at said station including a plurality of registers adapted to receive numerical information and to have such information erased therefrom, a master magnetic disk rotatable synchronously with said rotatable disk recording means, said master disk having recorded thereon pulses corresponding in number and time sequence to said registers, means at said station for producing from said recorded pulses different register-selection voltage combinations representative respectively of said registers, and occurring successively in timed relation with the rotation of said disk recording means, an operating station having a plurality of operating positions thereat, means under control of an operator at any one of said positions for producing a group of pulses indicative of a particular register and also containing numerical information which it is desired to store in that register, means for transmitting said pulses to said central station, means at said central station responsive to some of said pulses for producing a pattern of voltages, means responsive coincidently to said voltage combinations and said voltage pattern for selecting said register, means operable upon selection of said register for indicating at the operating position whether or not any number already stored in said register plus that to be stored exceeds a given number, and means operable only in the event that said given number will not be exceeded for erasing the number already in said register and for storing therein the sum of the erased number and the additional number which it is desired to store.

5. In an information storage system, a central station, a plurality of operating stations, a transmission line extending from each of said operating stations to said central station, a plurality of operating positions at each of said operating stations, a plurality of registers at said central station adapted to receive numerical information and to have such information erased therefrom, means under control of an operator at any one of said positions at any one of said stations for producing and sending over the line of said station a group of pulses indicative of a particular register and also containing numerical information which it is desired to store in that register, means for preventing transmissions over the lines of the other stations during the operation at said one station, means for preventing operations at the other positions of said one station during the operation at said one position, means at said central station responsive to said pulses for selecting said register, means operable upon selection of said register for indicating at said one position whether or not any number already stored in said register plus that to be stored exceeds a given number, and means operable only in the event that said given number will not be exceeded for erasing the number already in said register and for storing therein the sum of the erased number and the additional number which it is desired to store.

6. In an information storage system, movable recording means including a plurality of registers adapted to receive and store temporarily numerical information, means for producing different register-selection voltage combinations representative respectively of said registers and occurring successively in timed relation with said movable recording means, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, and means for temporarily storing said numerical information in said register.

7. In an information storage system, rotatable magnetic disk recording means including a plurality of registers adapted to receive and store temporarily numerical information, means for producing different register-selection voltage combinations representative respectively of said registers and occurring successively in timed relation with said rotatable disk recording means, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, and means for temporarily storing said numerical information in said register.

8. In an information storage system, rotatable magnetic disk recording means including a plurality of registers adapted to receive numerical information, a master magnetic disk rotatable synchronously with said rotatable disk recording means, said master disk having recorded thereon pulses corresponding in number and time sequence to said registers, means for producing from said recorded pulses different register-selection voltage combinations representative respectively of said registers and occurring successively in timed relation with said rotatable disk recording means, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, and means for storing said numerical information in said register.

9. In an information storage system, movable recording means including a plurality of registers for temporarily storing numerical information, means for producing different register-selection voltage combinations representative respectively of said registers and occurring successively in timed relation to said movable recording means, and means under control of an operator for selecting any one of said registers through the agency of said voltage combinations.

10. In an information storage system, rotatable magnetic disk recording means including a plurality of registers for temporarily storing numerical information, means for producing different register-selection voltage combinations representative respectively of said registers and occurring successively in timed relation to said rotatable disk recording means, and means under control of an operator for selecting any one of said registers through the agency of said voltage combinations.

11. In an information storage system, rotatable magnetic disk recording means including a plurality of registers for storing numerical information, a master magnetic disk rotatable synchronously with said rotatable disk recording means, said master disk having recorded thereon pulses corresponding in number and time sequence to said registers, means for producing from said recorded pulses different register-selection voltage combinations representative respectively of said registers and occurring successively in timed relation to said rotatable disk recording means, and means under control of an operator for selecting any one of said registers through the agency of said voltage combinations.

12. In an information storage system, movable recording means including a plurality of registers adapted to receive numerical information and to have such information erased therefrom, means for producing different register-selection voltage combinations representative respectively of said registers and occurring successively in timed relation with said movable recording means, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, means operable upon selection of said register for indicating whether or not any number already stored in said register plus that to be stored exceeds a given number, and means operable only in the event that said given number will not be exceeded for erasing the number already in said register and for storing therein the sum of the erased number and the additional number which it is desired to store.

13. In an information storage system, a central station, movable recording means at said station including a plurality of registers adapted to receive numerical information and to have such information erased therefrom, means at said station for producing different register-selection voltage combinations representative respectively of said registers and occurring successively in timed relation with said movable recording means, an operating station having a plurality of operating positions thereat, means under control of an operator at any one of said positions for producing a group of pulses indicative of a particular register and also containing numerical information which it is desired to store in that register, means for transmitting said pulses to said central station, means at said central station responsive to some of said pulses for producing a pattern of voltages, means responsive coincidently to said voltage combinations and said voltage pattern for selecting said register, means operable upon selection of said register for indicating at the operating position whether or not any number already stored in said register plus that to be stored exceeds a given number, and means operable only in the event that said given number will not be exceeded for erasing the number already in said register and for storing therein the sum of the erased number and the additional number which it is desired to store.

14. In an information storage system, a central station, an operating station, a transmission line extending between said stations, a plurality of operating positions at said operating station, movable recording means at said central station including a plurality of registers adapted to receive numerical information and to have such information erased therefrom, means at said central station for producing different register-selection voltage combinations representative respectively of said registers and occurring successively in timed relation with said movable recording means, means under control of an operator at any one of said positions for producing and sending over said line a group of pulses indicative of a particular register and also containing numerical information which it is desired to store in that register, means for preventing operations at the other positions during the operation at said one position, means at said central station responsive to some of said pulses for producing a pattern of voltages, means responsive coincidently to said voltage combinations and said voltage pattern for selecting said register, means operable upon selection of said register for indicating at said one position whether or not any number already stored in said register plus that to be stored exceeds a given number, and means operable only in the event that said given number will not be exceeded for erasing the number already in said register and for storing therein the sum of the erased number and the additional number which it is desired to store.

15. In an information storage system, a central station, a plurality of operating stations, a transmission line extending from each of said operating stations to said central station, a plurality of operating positions at each of said operating stations, movable recording means at said central station including a plurality of registers adapted to receive numerical information and to have such information erased therefrom, means at said central station for producing different register-selection voltage combinations representative respectively of said registers and occurring successively in timed relation with said movable recording means, means under control of an operator at any one of said positions at any one of said stations for producing and sending over the line of said station a group of pulses indicative of a particular register and also containing numerical information which it is desired to store in that register, means for preventing transmissions over the lines of the other stations during the operation at said one station, means for preventing operations at the other positions of said one station during the operation at said one position, means at said central station responsive to some of said pulses for producing a pattern of voltages, means responsive coincidently to said voltage combinations and said voltage pattern for selecting said register, means operable upon selection of said register for indicating at said one position whether or not any number already stored in said register plus that to be stored exceeds a given number, and means operable only in the event that said given number will not be exceeded for erasing the number already in said register and for storing therein the sum of the erased number and the additional number which it is desired to store.

16. A system for magnetic storage of a plurality of data respectively relating to different items of information, comprising a magnetic member having a plurality of magnetizable data storage portions respectively assignable to said different items of information, a magnetic recording and reading device adjacent to said magnetic storage member for selectively magnetizing any of said data storage portions for storing data thereon or alternatively for taking a reading of data previously stored thereon, means for transmitting signals including item selection signals to said storage apparatus, means for causing continuous relative rotation between said magnetic storage member and said magnetic recording and reading device for continuously scanning said plurality of data storage portions, circuits separately operable through said magnetic recording and reading device for causing the device to record or read as desired, selective means responsive to the received signals for rendering a desired one of said circuits operable, and means including a gating circuit having space discharge tubes and whose timing is controlled by the received selection signals and the instantaneous position of said recording and reading device relative to that of a data storage portion selected, thereby to effect a desired recording or reading operation.

17. In an information storage system, magnetic recording means having a plurality of information-recording sections constituting registers and also having a register-selection section on which are recorded pulses coordinated with said registers, means for producing from said recorded pulses different successively-occurring register-selection voltage combinations representative respectively of said registers, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, means operable upon selection of said register for indicating whether or not any number already stored in said register plus that to be stored exceeds a given number, and means operable only in the event that said given number will not be exceeded for erasing the number already in said register and for storing therein the sum of the erased number and the additional number which it is desired to store.

18. In an information storage system, a central station, magnetic recording means at said station having magnetic recording means having a plurality of information recording sections constituting registers and also having a register-selection section on which are recorded pulses coordinated with said registers, means for producing from said recorded pulses different successively - occurring register - selection voltage combinations representative respectively of said registers, an operating station having a plurality of operating positions thereat, means under control of an operator at any one of said positions for producing a group of pulses indicative of a particular register and also containing numerical information which it is desired to store in that register, means for transmitting said pulses to said central station, means at said central station responsive to some of said pulses for producing a pattern of voltages, means responsive coincidently to said voltage combinations and said voltage pattern for selecting said register, means operable upon selection of said register for indicating at the operating position whether or not any number already stored in said register plus that to be stored exceeds a given number, and means operable only in the event that said given number will not be exceeded for erasing the number already in said register and for storing therein the sum of the erased number and the additional number which it is desired to store.

19. In an information storage system, magnetic recording means having a plurality of information recording sections constituting registers and also having a register-selection section on which are recorded pulses coordinated with said registers, means for producing from said recorded pulses different successively-occurring register-selection voltage combinations representative respectively of said registers, means under control of an operator at a remote position for producing a group of pulses indicative of a particular register and also containing numerical information which it is desired to store in that register, means responsive to some of said pulses for producing a pattern of voltages, means responsive coincidently to said voltage combinations and said voltage pattern for selecting said register, and means for storing said numerical information in said register.

20. In an information storage system, magnetic recording means having a plurality of information recording sections constituting registers and also having a register-selection section on which are recorded pulses coordinated with said registers, means for producing from said recorded pulses different successively-occurring register-selection voltage combinations representative respectively of said registers, and means under control of an operator for selecting any one of said registers through the agency of said voltage combinations.

21. In an information storage system, spot magnetization recording means including a plurality of registers adapted to receive numerical information and to have such information erased therefrom, means under control of an operator at a remote position for producing a group of pulses indicative of a particular register and also containing numerical information which it is desired to store in that register, means responsive to said pulses for selecting said register, means operable upon selection of said register for indicating whether or not any number already stored in said register plus that to be stored exceeds a given number, and means operable only in the event that said given number will not be exceeded for erasing the number already in said register and for storing therein by spot magnetization the sum of the erased number and the additional number which it is desired to store.

22. In an information storage system, a central station, spot magnetization recording means including a plurality of registers at said station adapted to receive numerical information and to have such information erased therefrom, an operating station having a plurality of operating positions thereat, means under control of an operator at any one of said positions for producing a group of pulses indicative of a particular register and also containing numerical information which it is desired to store in that register, means for transmitting said pulses to said central station, means at said central station responsive to said pulses for selecting said register, means operable upon selection of said register for indicating at the operating position whether or not any number already stored in said register plus that to be stored exceeds a given number, and means operable only in the event that said given number will not be exceeded for erasing the number already in said register and for storing therein by spot magnetization the sum of the erased number and the additional number which it is desired to store.

23. In an information storage system, spot magnetization recording means including a plurality of registers adapted to receive numerical information and to have such information erased therefrom, manually settable keyboard means at a remote position, means operable cooperatively with said keyboard means to produce a group of pulses indicative of a particular register and also containing numerical information which it is desired to store in that register, means responsive to said pulses for selecting said register, means operable upon selection of said register for indicating whether or not any number already stored in said register plus that to be stored exceeds a given number, and means operable only in the event that said given number will not be exceeded for erasing the number already in said register and for storing therein by spot magnetization the sum of the erased number and the additional number which it is desired to store.

24. In an information storage system, a central station, an operating station, a transmission line extending between said stations, a plurality of operating positions at said operating station, spot magnetization recording means including a plurality of registers at said central station adapted to receive numerical information and to have such information erased therefrom, means under control of an operator at any one of said positions for producing and sending over said line a group of pulses indicative of a particular register and also containing numerical information which it is desired to store in that register, means for preventing operation at the other positions during the operation at said one position, means at said central station responsive to said pulses for selecting said register, means operable upon selection of said register for indicating at said one position whether or not any number already stored in said register plus that to be stored exceeds a given number, and means operable only in the event that said given number will not be exceeded for erasing the number already in said register and for storing therein by spot magnetization the sum of the erased number and the additional number which it is desired to store.

THOMAS K. SHARPLESS.
EDWIN S. EICHERT, JR.

REFERENCES CITED

The following references are of record in the file of this patent:

UNITED STATES PATENTS

| Number | Name | Date |
|---|---|---|
| 2,005,807 | Smith | June 25, 1935 |
| 2,046,381 | Hicks | July 7, 1936 |
| 2,224,244 | Hicks | Dec. 10, 1940 |
| 2,353,089 | Roth | July 4, 1944 |
| 2,359,617 | Bryce | Oct. 3, 1944 |
| 2,432,324 | May | Dec. 9, 1947 |
| 2,446,037 | Ammann | July 27, 1948 |
| 2,587,532 | Schmidt | Feb. 26, 1952 |